United States Patent
Eidenschink et al.

(10) Patent No.: US 9,637,099 B2
(45) Date of Patent: May 2, 2017

(54) PRESSURE CONTROL VALVE ARRANGEMENT HAVING DIAPHRAGM VALVES FOR CONTROLLING A FLUID PRESSURE IN AN ABS BRAKE SYSTEM OF A VEHICLE, HAVING A VALVE SEAT INTEGRATED IN A UNIPARTITE FASHION IN A PLASTIC HOUSING PART

(75) Inventors: Rainer Eidenschink, Munich (DE); Wilfried Gerber, Geretsried (DE); Wolfgang Rohn, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 676 days.

(21) Appl. No.: 12/970,108

(22) Filed: Dec. 16, 2010

(65) Prior Publication Data

US 2011/0132475 A1 Jun. 9, 2011

Related U.S. Application Data

(63) Continuation of application No. PCT/EP2009/003994, filed on Jun. 4, 2009.

(30) Foreign Application Priority Data

Jun. 17, 2008 (DE) .......................... 10 2008 028 440

(51) Int. Cl.
*F16K 31/02* (2006.01)
*B60T 8/36* (2006.01)

(52) U.S. Cl.
CPC .......... *B60T 8/3605* (2013.01); *B60T 8/3675* (2013.01); *Y10T 29/49405* (2015.01); *Y10T 137/7761* (2015.04)

(58) Field of Classification Search
CPC ................. B60T 8/3605; B60T 8/3675; Y10T 137/7761; Y10T 137/87193; Y10T 137/87209; Y10T 137/87217

(Continued)

(56) References Cited

U.S. PATENT DOCUMENTS 2,587,356 A * 2/1952 McPherson ......... F16K 31/0679
137/613
3,760,843 A 9/1973 Larner
(Continued)

FOREIGN PATENT DOCUMENTS

CH 375535 A 4/1964
DE 1 196 917 A 7/1965
(Continued)

OTHER PUBLICATIONS

German Office Action dated Dec. 3, 2008 with English translation (eight (8) pages).

(Continued)

*Primary Examiner* — Craig Schneider
*Assistant Examiner* — Minh Le
(74) *Attorney, Agent, or Firm* — Crowell & Moring LLP

(57) ABSTRACT

A pressure control valve arrangement is provided for controlling the fluid pressure in an ABS brake system of a vehicle such that, in the event of a tendency of individual wheels of the vehicle to lock, the brake pressure in associated brake cylinders can be adaptively adjusted. At least two diaphragm valves, which have diaphragms which are loaded by spring elements, and at least one electromagnetic control valve, which can be activated by an electronic control device for the pilot control of the diaphragm valves, are provided in a housing of the pressure control valve arrangement. At least one valve seat of the at least one electromagnetic control valve is formed in a unipartite fashion with a housing part which is formed by a plastic injection-molded blank.

20 Claims, 4 Drawing Sheets

(58) Field of Classification Search
USPC .......... 137/596.14, 596.16, 596.17; 251/368, 251/331; 303/119.1, 118.1
See application file for complete search history.

(56) References Cited

U.S. PATENT DOCUMENTS

| | | | |
|---|---|---|---|
| 3,976,335 A * | 8/1976 | Sekiguchi ................ | 303/118.1 |
| 3,977,734 A | 8/1976 | Roennhult et al. | |
| 4,355,661 A * | 10/1982 | Mayer .......................... | 137/881 |
| 4,372,620 A * | 2/1983 | Mekosh, Jr. ................ | 303/127 |
| 4,432,391 A | 2/1984 | Ott | |
| 4,576,416 A * | 3/1986 | Muller et al. ................ | 303/15 |
| 4,736,177 A * | 4/1988 | Vollmer .................... | H01F 7/16 335/299 |
| 5,342,119 A * | 8/1994 | Smith et al. ............... | 303/113.2 |
| 5,443,093 A * | 8/1995 | Stoll et al. ............... | 137/596.17 |
| 5,454,399 A * | 10/1995 | Kazakis et al. .......... | 137/596.16 |
| 5,707,039 A * | 1/1998 | Hamilton ............ | F16K 31/0655 251/129.15 |
| 5,733,018 A * | 3/1998 | Goebels et al. ........... | 303/118.1 |
| 5,988,772 A * | 11/1999 | Hashida ..................... | 303/119.3 |
| 6,209,971 B1 * | 4/2001 | Ho et al. ..................... | 303/119.3 |
| 6,328,065 B1 * | 12/2001 | Schmid et al. ........... | 137/596.17 |
| 6,467,502 B1 * | 10/2002 | Johnson et al. ......... | 137/596.17 |
| 6,467,854 B2 * | 10/2002 | Frank et al. ............... | 303/118.1 |
| 6,554,027 B1 * | 4/2003 | Schuurman ................... | 137/881 |
| 6,955,337 B2 * | 10/2005 | Weber et al. ............ | 251/129.15 |
| 7,040,716 B2 * | 5/2006 | Kawaguchi et al. .......... | 303/20 |
| 7,044,431 B2 | 5/2006 | Stumpe | |
| 7,201,187 B2 * | 4/2007 | Irwin ....................... | F16K 7/17 137/625.28 |
| 9,022,067 B2 * | 5/2015 | Keller ................ | F16K 31/0655 123/90.11 |
| 2003/0217776 A1 * | 11/2003 | Kulmann et al. ........ | 137/625.27 |
| 2005/0110342 A1 * | 5/2005 | Eberling et al. .......... | 303/115.1 |
| 2006/0284480 A1 * | 12/2006 | Rudolph .............. | B60T 13/261 303/127 |
| 2009/0114865 A1 * | 5/2009 | Homann et al. ......... | 251/129.15 |
| 2010/0038571 A1 | 2/2010 | Frank et al. | |
| 2010/0072412 A1 * | 3/2010 | Frank et al. .................. | 251/366 |
| 2010/0139518 A1 * | 6/2010 | Baumann et al. ............ | 102/523 |
| 2011/0095217 A1 * | 4/2011 | Schlenker et al. ....... | 251/129.15 |
| 2011/0155936 A1 * | 6/2011 | Ellwein et al. ....... | 251/129.15 |

FOREIGN PATENT DOCUMENTS

| | | | | |
|---|---|---|---|---|
| DE | 2 204 394 A | 10/1972 | | |
| DE | 2 224 180 A | 11/1973 | | |
| DE | 25 17 571 A1 | 10/1975 | | |
| DE | 28 55 876 A1 | 7/1980 | | |
| DE | 29 38 437 A1 | 4/1981 | | |
| DE | 30 38 802 A1 | 5/1982 | | |
| DE | 34 37 541 A1 | 4/1986 | | |
| DE | 3821044 A1 * | 6/1989 | ............... | B60T 8/32 |
| DE | 38 25 549 A1 | 2/1990 | | |
| DE | 39 06 548 A1 | 9/1990 | | |
| DE | 39 31 761 A1 | 4/1991 | | |
| DE | 197 01 200 A1 | 7/1998 | | |
| DE | 199 18 070 A1 | 12/1999 | | |
| DE | 199 23 456 C1 | 11/2000 | | |
| DE | 100 46 979 A1 | 5/2002 | | |
| DE | 101 56 773 A1 | 6/2003 | | |
| DE | 10 2005 018 888 A1 | 11/2006 | | |
| EP | 0 107 445 A1 | 5/1984 | | |
| EP | 0 498 584 A1 | 8/1992 | | |
| GB | 1 416 204 A | 12/1975 | | |
| GB | 2 059 018 A | 4/1981 | | |
| WO | WO 2008/034525 A1 | 3/2008 | | |

OTHER PUBLICATIONS

International Search Report dated Sep. 14, 2009 with English translation (six (6) pages).

* cited by examiner

PRESSURE CONTROL VALVE ARRANGEMENT HAVING DIAPHRAGM VALVES FOR CONTROLLING A FLUID PRESSURE IN AN ABS BRAKE SYSTEM OF A VEHICLE, HAVING A VALVE SEAT INTEGRATED IN A UNIPARTITE FASHION IN A PLASTIC HOUSING PART

CROSS-REFERENCE TO RELATED APPLICATIONS

This application is a continuation of PCT International Application No. PCT/EP2009/003994, filed Jun. 4, 2009, which claims priority under 35 U.S.C. §119 to German Patent Application No. DE 10 2008 028 440.8, filed Jun. 17, 2008, the entire disclosures of which are herein expressly incorporated by reference.

BACKGROUND AND SUMMARY OF THE INVENTION

The invention relates to a pressure control valve arrangement for controlling the fluid pressure in an ABS brake system of a vehicle in such a manner that, in the event of a tendency of individual wheels of the vehicle to lock, the brake pressure in associated brake cylinders can be adaptively adjusted. At least two diaphragm valves having diaphragms loaded by spring elements, and at least one electromagnetic control valve, which can be activated by an electronic control device and is intended for the pilot control of the diaphragm valves, are provided in a housing of the pressure control valve arrangement. The invention also relates to a method for producing the pressure control valve arrangement.

An ABS (antilock brake system) prevents locking of the wheels and enters into operation if a greater adhesion is required between a tire and the roadway than can be transmitted, i.e. if the driver overbrakes. In the event of overbraking, the central electronic control unit of the ABS brake system identifies, from rotational speed sensor signals, the tendency of one or more wheels to lock and calculates therefrom the activation of the pressure control valve arrangement acting on the associated brake cylinder. The brake pressure is then adjusted to optimum slip via the pressure control valve arrangement, which may be reduced, maintained or built-up in accordance with the wheel behavior and, therefore, the frictional conditions between tire and roadway.

A pressure control valve arrangement of the above-mentioned type for an ABS brake system is known from DE 101 56 773 A1. Single-channel pressure control valves with and without a relay action are generally used for ABS brake systems of vehicles. Pressure control valve arrangements with a relay action are used in semitrailers and drawbar trailers. ABS pressure control valve arrangements without a relay action, which is the area of concern in the present invention, are used in all other vehicles, for example in commercial vehicles, buses, semitrucks and also in trailers. Pressure control valve arrangements without a relay action have 3/2-way solenoid valves as pilot valves of diaphragm valves, an electronic control device activating the 3/2-way solenoid valves in order to be able to carry out the "pressure-maintaining", "pressure-dissipating" and "pressure-building-up" functions necessary for ABS operation. During braking without response of the ABS (no tendency of a wheel to lock), the pressure medium, generally air, when ventilating and venting the brake cylinders, flows unobstructed through the pressure control valve arrangements in both directions. It is therefore ensured that the operation of the service brake system is not affected by the ABS pressure control valve arrangement.

There is therefore needed a pressure control valve arrangement that it is simpler to produce and install. At the same time, a corresponding method is needed for producing such a pressure control valve arrangement.

These and other needs are met by a pressure control valve arrangement, and a method of making the same, for controlling the fluid pressure in an ABS brake system of a vehicle such that, in the event of a tendency of individual wheels of the vehicle to lock, the brake pressure in associated brake cylinders can be adaptively adjusted, wherein at least two diaphragm valves having diaphragms loaded by spring elements, and at least one electromagnetic control valve, which can be activated by an electronic control device and is intended for the pilot control of the diaphragm valves, are provided in a housing of the pressure control valve arrangement. At least one valve seat of the at least one electromagnetic control valve is formed in a unipartite fashion with a housing part which is formed by a plastic injection-molded blank.

Advantageously, the valve seat does not need further machining and, after the primary forming together with the housing part, is then not machined further, for example by cutting, since the surface quality and roughness of an injection-molded plastic sufficiently meet the tightness requirements imposed on a valve seat of this type. The valve seat therefore does not need to be formed by inserts in the form of additional components, which results in an advantageous reduction in the number of components in the pressure control valve arrangement, and therefore the production and installation costs turn out to be advantageously lower.

According to particularly preferred embodiments, the housing part having the at least one valve seat is a plate-like, fiber-reinforced plastic injection-molded blank, wherein the housing part is composed, for example, of fiber-reinforced polyamide. A plastic of this type has a relatively high strength, stiffness and hardness, and is therefore suitable for the permanent loading necessary within the context of the ABS valve operation.

In particular, the at least one valve seat is formed on a surface of the housing part that faces another housing part in which the further components of the at least one electromagnetic control valve, such as an armature and a magnet core, are accommodated. A functional, electromagnetic control valve can then be obtained in a simple manner by the other housing part receiving the further components of the at least one electromagnetic control valve, such as the armature and the magnet core, being connected to the first housing part on which the valve seat is formed.

The other housing part receiving the further components of the at least one electromagnetic control valve, such as the armature and the magnet core, is preferably a plastic injection-molded blank into which at least one magnet coil of the electromagnetic control valve is injected. The measure further reduces the outlay on producing and installing the pressure control valve arrangement.

According to one development, the other housing part is provided with at least one passage bore for the insertion of the further components of the electromagnetic control valve, such as the armature and the magnet core, a center axis of the passage bore being arranged coaxially with respect to the valve seat. The at least one passage bore in the other housing part can then be closed by a cover.

On the basis of the above-described configuration of the components of the pressure control valve arrangement, the method for producing the latter then contains at least the following steps:

a) primary forming of one housing part of the housing as a plastic injection-molded blank together with at least one valve seat of the at least one electromagnetic control valve in a surface which faces the other housing part receiving the further components of the at least one electromagnetic control valve, such as an armature and a magnet core, b) producing at least one passage bore in the other housing part of the housing for receiving the further components of the at least one electromagnetic control valve, a center axis of the passage bore being coaxial with the valve seat in the first housing part, c) inserting the further components of the at least one electromagnetic control valve into the other housing part, d) fastening the other housing part to the first housing part such that the at least one valve seat in the first housing part can interact with the further components of the at least one electromagnetic control valve, which components are arranged in the other housing part.

All of the main components of the electromagnetic control valve, such as the one housing part with the valve seat and the other housing part for receiving the further components of the electromagnetic control valve, such as the armature and the magnet core, can then be installed from a single installation direction, preferably vertically and from above, this having the advantage that there does not have to be a retooling operation during installation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
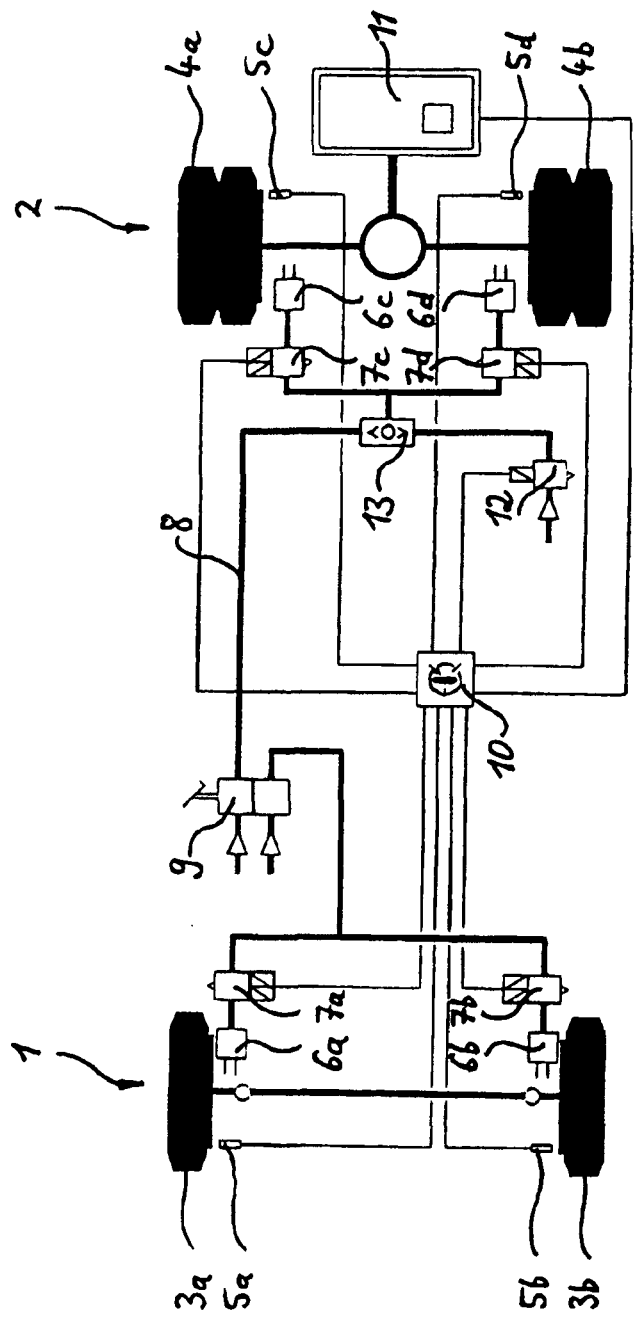
FIG. 1 is a schematic diagram of an ABS brake system in the form of a general diagram of a 4S/4C ABS brake system of a vehicle.

According to FIG. 1, a vehicle equipped with an ABS brake system has a front axle 1 and a rear axle 2. Wheels 3a and 3b are arranged on the front axle 1; the rear axle 2 has wheels 4a and 4b each equipped, for example, with dual tires. The ABS brake system serving for braking the wheels 3a, 3b and 4a, 4b is designed here in the manner of a 4S/4C system (four sensors, four channels). This means that here a total of four rotational speed sensors 5a-5d and four pressure control vale arrangements 7a-7d are available. The pressure control valve arrangements 7a-7d serve to activate respectively associated brake cylinders 6a-6d. All of the pressure control valve arrangements 7a-7d are connected to a foot brake valve 9 via a pneumatic brake pressure line 8 branching off from the arrangement.

When the foot brake valve 9 is actuated, the driver generates a brake pressure which, passing through the pressure control valve arrangements 7a-7d, is passed on via the pneumatic brake pressure line 8 to the brake cylinders 6a-6d associated with the wheels 3a, 3b and the wheels 4a, 4b.

Figure 2A:
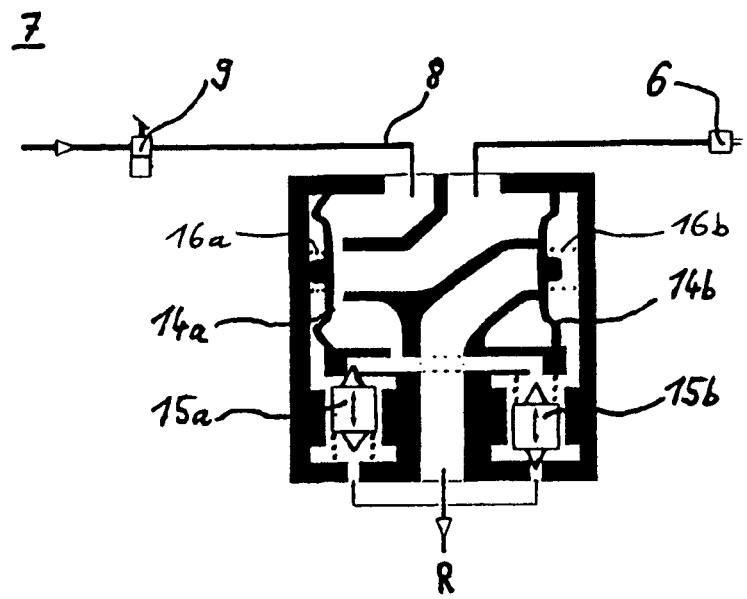
FIG. 2a is a schematic illustration of a pressure control valve arrangement, activating a brake cylinder, in the open state (building-up of pressure)
Figure 2B:
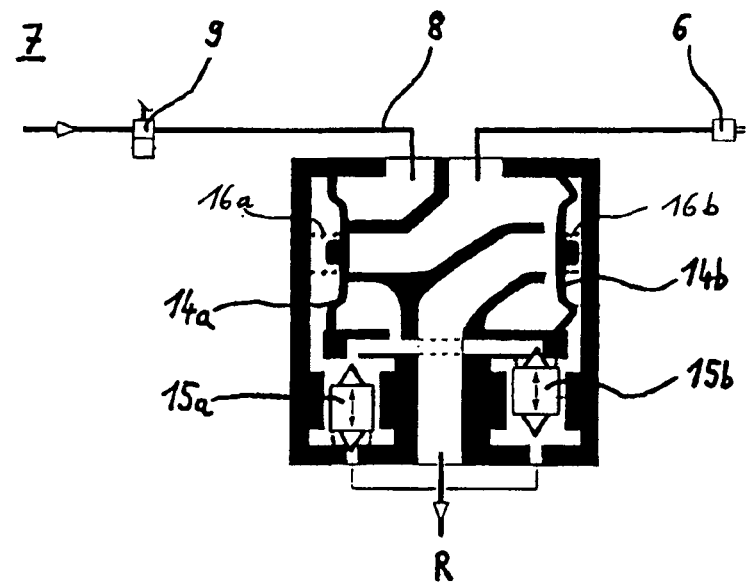
FIG. 2b is a schematic illustration of the pressure control valve arrangement from FIG. 2a in the closed state (dissipating of pressure)
Figure 4:
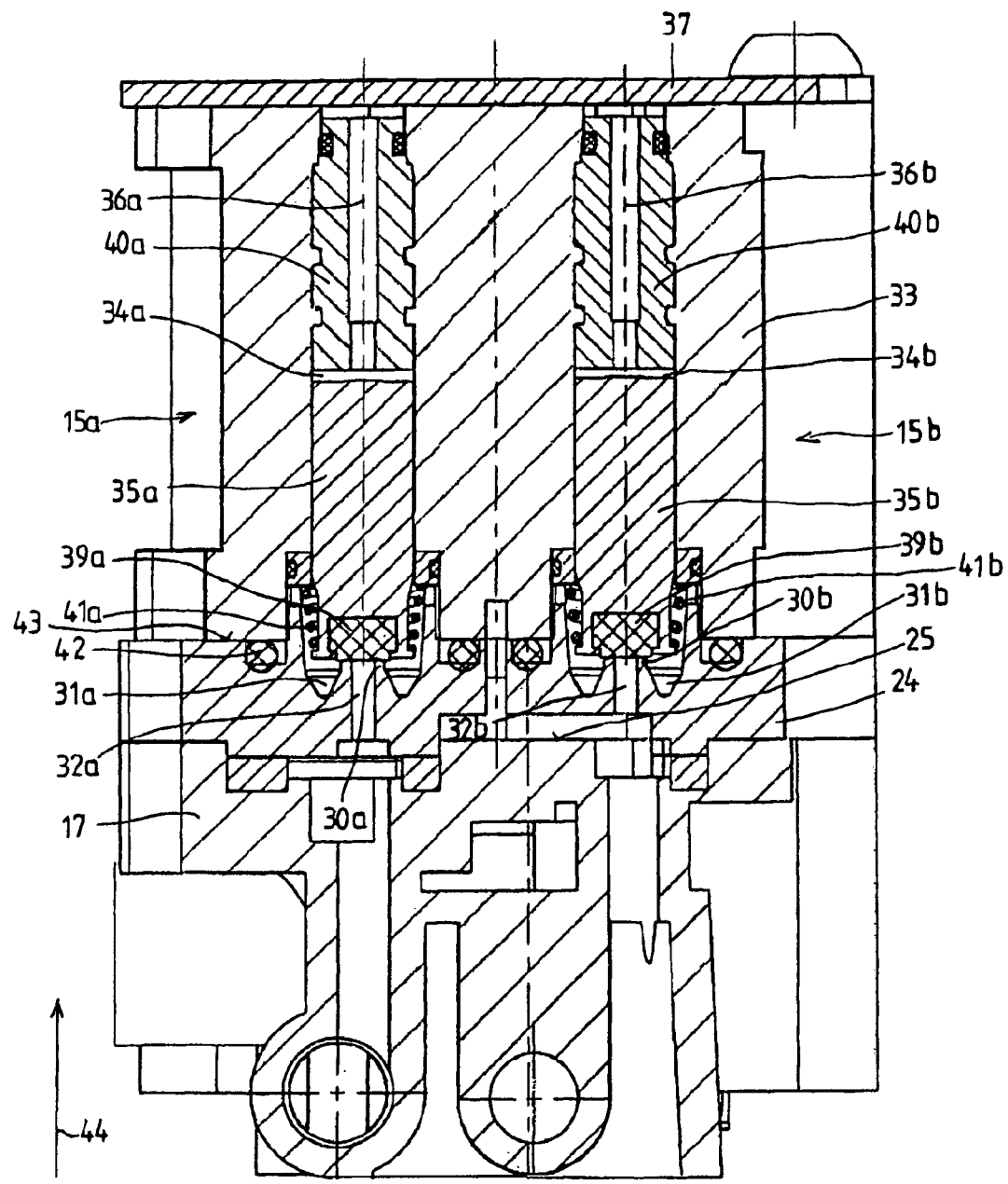
FIG. 4 is a cross-sectional illustration taken along the line Iv-Iv from FIG. 3.

The pressure control valve arrangements 7a-7d can be activated via integrated solenoid valves 15a, 15b, which are shown in FIG. 2a, FIG. 2b and FIG. 4, and, for this purpose, are electrically connected to a central electronic control unit 10. On the input side, the electronic control unit 10 is connected to the four rotational speed sensors 5a-5b which determine the wheel speeds. In the event of a wheel 3a-3d locking, in accordance with ABS control as provided in the electronic control unit 10, the brake pressure input by the driver via the foot brake valve 9 is reduced by the corresponding pressure control valve arrangement 7a-7d until the locking is eliminated. The ABS brake system of the present exemplary embodiment furthermore includes an ASR function which involves an ASR unit 11 for reducing the engine torque, and an ASR solenoid valve 12 and a shuttle valve 13.

The pressure control valve arrangement 7 used according to FIG. 2a within the context of the ABS brake system for the purpose of ABS control is constructed here in the manner of a one-channel pressure control valve arrangement and essentially consists of two integrated diaphragm valves 14a and 14b and two spring-loaded solenoid valves 15a, 15b activating the latter. The diaphragm valves 14a and 14b are each loaded in the closing direction by spring elements 16a, 16b and are subjected to pilot control via the respectively assigned solenoid valves 15a and 15b.

The pressure control valve arrangement 7 is shown in FIG. 2a in the open position thereof, in which pressure is built up with respect to the connected brake cylinder 6. None of the solenoid valves 15a and 15b is electrically activated here. In the position shown, the compressed air coming from the foot brake valve 9 pushes open the diaphragm valve 14a, which is designed as an inlet valve. The normally closed solenoid valve 15a prevents the associated diaphragm valve 14a from being closed again. The normally open second solenoid valve 15b means that the brake pressure coming from the foot brake valve 9 closes the second diaphragm valve 14b, which serves as an outlet valve. The compressed air therefore runs unobstructed through the pressure control valve arrangement 7. The pressure control valve arrangement 7 is also in this state if there is no ABS control.

In order to maintain the brake pressure in a brake cylinder 6a to 6d, only the solenoid valve 15a has to be energized, as a result of which the solenoid valve opens and, as a consequence of the brake pressure coming from the foot brake valve 9, shuts the diaphragm valve 14a on the inlet side. The pressure on the right and left sides of the diaphragm valve 14a is now equal. Since, however, the operative surface on the left side of the diaphragm valve 14a is larger, the diaphragm valve 14a is closed. The same applies to the diaphragm valve 14b which is on the outlet side and which is activated via the solenoid valve 15b. Therefore, in order to maintain the pressure, the pressure control valve arrangement 7 closes the pneumatic brake pressure line 8 running from the foot brake valve 9 to the brake cylinder 6.

According to FIG. 2b, pressure in a brake cylinder 6a to 6d is dissipated by the two solenoid valves 15a and 15b being energized. What has been described above with regard to maintaining the pressure applies to the solenoid valve 15a and the associated diaphragm valve 14a on the inlet side. By contrast, the energizing means that the other solenoid valve 15b is closed. The pressure coming from the brake cylinder 6 therefore presses open the diaphragm valve 14b on the outlet side, and the brake cylinder 6 is vented.

The above-described functions of the pressure control valve arrangement 7 are carried out as provided in the electronic control unit 10 within the context of an ABS/ASR control as described at the beginning.

Figure 3:
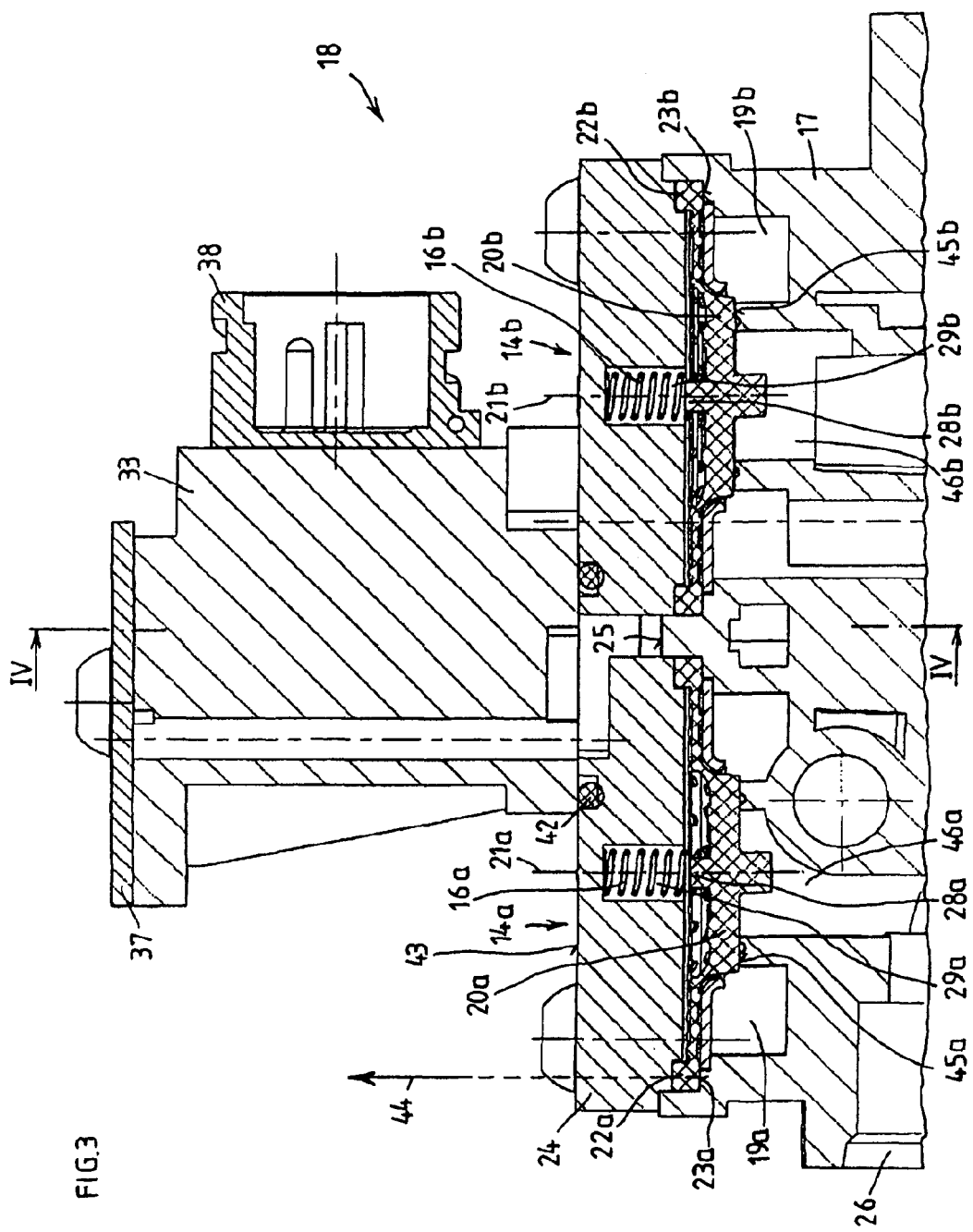
FIG. 3 is a cross-sectional illustration of a specific embodiment of the pressure control valve arrangement from FIG. 2a and FIG. 2b according to a preferred embodiment of the invention.

FIG. 3 and FIG. 4 show the pressure control valve arrangement 7, which is merely illustrated schematically in FIG. 2a and FIG. 2b, in a specific embodiment in the fitted position, i.e. components which are illustrated at the top are located at the top. In this embodiment, the two solenoid valves 15a, 15b for the pilot control of the diaphragm valves 14a, 14b are combined in a double solenoid valve, the function of which, however, is analogous to individual valves 15a, 15b.

Two openings 19a, 19b, which are arranged next to each other, for the insertion or placing in of diaphragms 20a, 20b of the diaphragm valves 14a, 14b are provided on a surface, an upper surface in FIG. 3 and FIG. 4, of a lower housing part 17 of a housing 18 of the pressure control valve arrangement 7. The center axes 21a, 21b of the openings 19a, 19b are parallel to each other and are oriented vertically. The diaphragms 20a, 20b respectively interact with a diaphragm valve seat 45a, 45b, a flow cross section of a fluid channel 46a, 46b being opened up or closed by a diaphragm 20a, 20b, depending on whether the diaphragm 20a, 20b is sitting on the diaphragm valve seat 45a, 45b or is raised from the latter.

The diaphragm edges 22a, 22b of the diaphragms 20a, 20b are held between opening edges 23a, 23b of the openings 19a, 19b and a further housing part 24 of the housing 18 of the pressure control valve arrangement 7, the opening edges 23a, 23b of the openings 19a, 19b preferably lying in a common plane, and the imaginary surface normals of the opening edges 23a, 23b of the openings 19a, 19b, the direction of which is indicated by the arrow 44 in FIG. 3 and FIG. 4, pointing in the same direction, upward here. As an alternative, the opening edges 23a, 23b of the openings 19a, 19b could also lie in parallel planes, which would mean in the present case that they are arranged offset vertically according to FIG. 3.

The diaphragms 20a, 20b are preferably produced from an elastomer, such as, for example, NBR, by primary forming. The diaphragms are connected to each other after removal from the mold possibly by use of seals which are molded on or injected.

The further housing part 24 consists, for example, of an intermediate plate which makes contact with an upper surface 25 of the lower housing part 17, which surface has the openings 19a, 19b for the diaphragms 20a, 20b, and is fastened to the lower housing part 17, preferably by screwing thereto.

All of the screw connections for fluid lines to be connected to the pressure control valve arrangement 7 are formed in the housing part 17 which is the lower housing part in FIG. 3 and FIG. 4 and has the openings 19a, 19b for the diaphragms 20a, 20b. The lower housing part 17 is formed by a light metal injection-molded blank. The lower housing part 17 particularly preferably consists of an aluminum die-cast component. One of the screw connections 26 is illustrated by way of example in FIG. 3. The screw connections 26 are preferably produced directly, i.e. without the provision of threaded inserts, in the lower housing part, for example by thread cutting.

The spring elements 16a, 16b loading diaphragms 20a, 20b of the diaphragm valves 14a, 14b are supported on one side centrally on the diaphragms 20a, 20b, for example by way of centering pins 28a, 28b protruding away from the diaphragms 20a, 20b, and on the other side on the intermediate plate 24. For the at least partial receiving of the spring elements 16a, 16b, the intermediate plate 24 is provided with blind hole bores 29a, 29b facing the lower housing part 17. The spring elements 16a, 16b are, for example, helical springs having preferably vertical spring center axes such that the direction of movement or operation of the diaphragms 20a, 20b is parallel to an installation direction, which will be explained further on. When the intermediate plate 24 is installed, the spring elements 16a, 16b are therefore automatically centered both on the lower housing part 17 and on the intermediate plate 24, and are fixed in their fitted position.

The intermediate plate 24 is particularly preferably formed by a plastic injection-molded blank made, for example, of polyamide, with valve seats 30a, 30b of the solenoid valves 15a, 15b being formed in a unipartite fashion with the intermediate plate 24. As is clear in particular from FIG. 4, the valve seats 30a, 30b are of conical design by that surface 43 of the intermediate plate 24 which has the valve seats 30a, 30b being provided with annular blind hole recesses 31a, 31b. Fluid channels 32a, 32b running vertically in the mouth region open in the region of the valve seats 30a, 30b.

The intermediate plate 24 forming the valve seats 30a, 30b is arranged between the lower housing part 17, which has the screw connections 26 and the openings 19a, 19b for the diaphragms 20a, 20b, and a housing part 33 which is the upper housing part in FIG. 3 and FIG. 4 and in which the components of the solenoid valves 15a, 15b, with the exception of the valve seats 30a, 30b formed in the intermediate plate 24, are accommodated. The valve seats 30a, 30b of the two solenoid valves 15a, 15b are formed on that surface 43 of the intermediate plate 24 which faces the upper housing part 33.

The upper housing part 33 is preferably provided with two passage bores 34a, 34b for the insertion of components of the solenoid valves 15a, 15b, such as the armatures 35a, 35b and magnet cores 36a, 36b thereof, wherein the center axes 36a, 36b of the passage bores 34a, 34b are arranged parallel to the surface normals of the opening edges 23a, 23b of the openings 19a, 19b in the lower housing part 17, which surface normals point in the direction of the arrow 44. Furthermore, the center axes 36a, 36b of the passage bores 34a, 34b are arranged coaxially with respect to the valve seats 30a, 30b.

The passage bores 34a, 34b of the upper housing part 33 are closed by a cover 37 which is preferably a punched part made of steel sheet. Furthermore, the upper housing part 33 is, for example, a plastic injection-molded blank into which the two magnet coils (not visible in the figures) of the solenoid valves 15a, 15b are injected. By means of the plug-in contact housing 38 arranged on the upper housing part 33, the magnet coils of the solenoid valves 15a, 15b can be activated by the electronic control unit 10.

The armatures 35a, 35b of the solenoid valves 15a, 15b are guided movably vertically in the passage bores 34a, 34b of the upper housing part 33, i.e. parallel to the surface normals 44 of the opening edges 23a, 23b of the openings 19a, 19b for the diaphragms 20a, 20b, with, for example, closing elements 39a, 39b made of an elastomer being arranged at the ends facing the valve seats 30a, 30b. Depending on the energizing of the magnet coils of the solenoid valves 15a, 15b, the armatures 35a, 35b therefore adopt a vertical position in which the closing elements 39a, 39b are in contact with the valve seats 30a, 30b and therefore close the corresponding fluid channel 32a, 32b, or in which the closing elements are raised from the valve seats 30a, 30b and therefore open up a flow cross section. The stroke of the armatures 35a, 35b is limited by the magnet cores 40a, 40b which are inserted from above into the passage bores 34a, 34b and are fixed there. By means of spring elements 41a, 41b, which are supported at one end on the armatures 35a, 35b and at the other end on the upper housing 33, the armatures 35a, 35b are prestressed in the direction of the valve seats 30a, 30b.

The housing 18 of the pressure control valve arrangement 7 particularly preferably consists merely or exclusively of three housing parts, namely the lower housing part 17, the intermediate plate 24 and the upper housing part 33. These three housing parts 17, 24 and 33 are, for example, screwed to one another, with fluid-conducting channels being sealed off at separating planes of the housing parts by means of seals 42.

The pressure control valve arrangement 7 is then installed, preferably from above here, by at least the following steps taking place in a single installation direction, which is vertical here, without retooling being necessary:

a) primary forming of the diaphragms 20a, 20b of the two diaphragm valves 14a, 14b, wherein the diaphragms 20a, 20b are connected to each other possibly by way of molded on or injected seals, b) producing the valve seats 30a, 30b of the solenoid valves 15a, 15b in the intermediate plate 24 in the surface 43 which faces the upper housing part 33, c) producing the passage bores 34a, 34b in the upper housing part 33 of the housing 18 for receiving components of the solenoid valves 15a, 15b, such as the armatures 35a, 35b and the magnet cores 40a, 40b, wherein the center axes 36a, 36b of the passage bores 34a, 34b are parallel to the surface normals 44 of the opening edges 23a, 23b of the openings 19a, 19b in the lower housing part 17, d) arranging and clamping the lower housing part 17 in such a manner that the surface normals 44 of the opening edges 23a, 23b of the openings 19a, 19b point upward, e) placing the diaphragms 20a, 20b of the diaphragm valves 14a, 14b from above into the openings 19a, 19b of the lower housing part 17 in such a manner that the diaphragm edges 22a, 22b rest on the opening edges 23a, 23b, f) optionally removing the seals which have been molded on or injected and which connect the diaphragms 20a, 20b, g) fitting the spring elements 16a, 16b onto the diaphragms 20a, 20b and introducing the spring elements 16a, 16b into the blind hole bores 29a, 29b of the intermediate plate 24, h) fitting the intermediate plate 24 onto the lower housing part 17 in such a manner that on the one hand the diaphragm edges 22a, 22b are clamped or locked between the lower housing part 17 and the intermediate plate 24 and on the other hand the spring elements 16a, 16b are supported on the diaphragms 20a, 20b and the intermediate plate 24, i) inserting the components of the solenoid vales 15a, 15b, such as, for example, the armatures 35a, 35b and the magnet cores 40a, 40b, into the passage bores 34a, 34b of the upper housing part 33, preferably from below, j) fitting the upper housing part 33 onto the intermediate plate 24 from above in such a manner that the valve seats 30a, 30b in the intermediate plate 24 can interact with the armatures 35a, 35b of the solenoid valves 15a, 15b.

Table of Reference Numbers

| | |
|---|---|
| 1 | Front axle |
| 2 | Rear axle |
| 3 | Wheel |
| 4 | Wheel |
| 5 | Rotational speed sensor |
| 6 | Brake cylinder |
| 7 | Pressure control valve arrangement |
| 8 | Brake pressure line |
| 9 | Footbrake valve |
| 10 | Control unit |
| 11 | ASR unit |
| 12 | ASR solenoid valve |
| 13 | Shuttle valve |
| 14 | Diaphragm valve |
| 15 | Solenoid valve |
| 16 | Spring element |
| 17 | Lower housing part |
| 18 | Housing |
| 19 | Openings |
| 20 | Diaphragms |
| 21 | Center axes |
| 22 | Diaphragm edges |
| 23 | Opening edges |
| 24 | Intermediate plate |
| 25 | Surface |
| 26 | Screw connection |
| 28 | Centering pin |
| 29 | Blind hole bore |
| 30 | Valve seats |
| 31 | Blind hole recesses |
| 32 | Fluid channels |
| 33 | Upper housing part |
| 34 | Passage bores |
| 35 | Armature |
| 36 | Center axis |
| 37 | Cover |
| 38 | Plug-in contact housing |
| 39 | Closing elements |
| 40 | Magnet cores |
| 41 | Spring elements |
| 42 | Seals |
| 43 | Surface |
| 44 | Surface normal |
| 45 | Diaphragm valve seat |
| 46 | Fluid channel |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressure control valve arrangement for controlling fluid pressure in an ABS brake system of a vehicle, the pressure control valve arrangement comprising:
    at least two diaphragm valves having diaphragms loaded by spring elements, the spring elements being supported by centering pins that are formed integrally with the at least two diaphragm valves;
    at least one electromagnetic control valve activatable by an electronic control device, the at least one electromagnetic control valve being configured for pilot control of the two diaphragm valves; and
    a housing of the pressure control valve arrangement in which are arranged the two diaphragm valves and the at least one electromagnetic control valve, wherein
    a part of the housing is a plastic injection-molded blank that comprises in a unipartite construction at least one valve seat of the at least one electromagnetic control valve, the part of the housing being a single intermediate plate, the single intermediate plate is arranged between a housing part which has openings for the diaphragms and another housing part, in which the components of the at least one electromagnetic control valve are accommodated, with the exception of the at least one valve seat formed in the single intermediate plate, the housing of the pressure control arrangement consists exclusively of the housing part, the single intermediate plate and the another housing part, the another housing part is a plastic injection-molded blank into which at least one magnet coil of the at least one electromagnetic control valve is injected, the another housing part being injection-molded around the at least one magnet coil, and on which a plug-in contact housing, that is a separate piece from the another housing part of the housing, is arranged for control of said at least one magnet coil of said at least one electromagnetic control valve by an external electronic control unit, the at least one electromagnetic control valve is arranged to seal against the at least one valve seat, and the at least one valve seat has a conical shape and delimits a central fluid channel in the housing part, the conical shape being defined by a surface of the intermediate plate, and the at least one valve seat being provided with at least one annular blind hole recess having a tapered conical profile that facilitates the molding process.

2. The pressure control valve arrangement according to claim 1, wherein the housing part with the at least one valve seat is a plate-like fiber-reinforced plastic injection-molded blank.

3. The pressure control valve arrangement according to claim 2, wherein the housing part comprises fiber-reinforced polyamide.

4. The pressure control valve arrangement according claim 1, further comprising a spring, wherein the housing defines an opening into which an armature is fitted, the armature having a flanged first end against which the spring abuts.

5. The pressure control valve arrangement according to claim 1, wherein the at least one valve seat is operatively configured on a surface of the housing part facing the another housing part in which further components of the at least one electromagnetic control valve are accommodated.

6. The pressure control valve arrangement according to claim 5, wherein said further components comprise an armature and a magnet core of the at least one electromagnetic control valve.

7. The pressure control valve arrangement according to claim 4, wherein the at least one valve seat is operatively configured on a surface of the housing part facing the another housing part in which further components of the at least one electromagnetic control valve are accommodated.

8. The pressure control valve arrangement according to claim 7, wherein said further components comprise an armature and a magnet core of the at least one electromagnetic control valve.

9. The pressure control valve arrangement according to claim 5, wherein the another housing part is connected to the housing part having the valve seat.

10. The pressure control valve arrangement according to claim 8, wherein the another housing part is connected to the housing part having the valve seat.

11. The pressure control valve arrangement according to claim 5, wherein the another housing part is a plastic injection-molded blank into which at least one magnet coil of the at least one electromagnetic control valve is injected.

12. The pressure control valve arrangement according to claim 9, wherein the another housing part is a plastic injection-molded blank into which at least one magnet coil of the at least one electromagnetic control valve is injected.

13. The pressure control valve arrangement according to claim 5, wherein the another housing part comprises at least one passage bore in which said further components are insertable, a center axis of the passage bore being arranged coaxially with respect to the at least one valve seat.

14. The pressure control valve arrangement according to claim 6, wherein the another housing part comprises at least one passage bore in which said further components are insertable, a center axis of the passage bore being arranged coaxially with respect to the at least one valve seat.

15. The pressure control valve arrangement according to claim 11, wherein the another housing part comprises at least one passage bore in which said further components are insertable, a center axis of the passage bore being arranged coaxially with respect to the at least one valve seat.

16. The pressure control valve arrangement according to claim 13, further comprising a cover operatively arranged to close the at least one passage bore.

17. The pressure control valve arrangement according to claim 1, wherein said arrangement is a single-channel pressure control valve arrangement.

18. The pressure control valve arrangement according to claim 1, wherein said pressure control valve arrangement controls fluid pressure in the ABS brake system of the vehicle such that in an event of a tendency for individual wheels of the vehicle to lock, brake pressure in associated brake cylinders is adaptively adjusted.

19. A method of making a pressure control valve arrangement for controlling fluid pressure in an ABS brake system of a vehicle, the method comprising the acts of:

forming at least two diaphragm valves having diaphragms loaded by spring elements, the spring elements being supported by centering pins that are formed integrally with the at least two diaphragm valves;

forming at least one electromagnetic control valve activatable by an electronic control device, the at least one electromagnetic control valve being configured for pilot control of the at least two diaphragm valves; and forming a housing of the pressure control valve arrangement in which are arranged the at least two diaphragm valves and the at least one electromagnetic control valve, wherein a part of the housing is a plastic injection-molded blank that comprises in a unipartite construction at least one valve scat of the at least one electromagnetic control valve, the part of the housing being a single intermediate plate, the single intermediate plate is arranged between a housing part which has openings for the diaphragms and another housing part, in which the components of the at least one electromagnetic control valve are accommodated, with the exception of the at least one valve seat formed in the single intermediate plate, the housing of the pressure control arrangement consists exclusively of the housing part, the single intermediate plate and the another housing part, the another housing part is a plastic injection-molded blank into which at least one magnet coil of the at least one electromagnetic control valve is injected, the another housing part being injection-molded around the at least one magnet coil, and on which a plug-in contact housing, that is a separate piece from the another housing part of the housing, is arranged for control of said at least one magnet coil of said at least one electromagnetic control valve by an external electronic control unit, the at least one electromagnetic control valve is arranged to seal against the at least one valve seat, and the at least one valve seat has a conical shape and delimits a central fluid channel in the housing part, the conical shape being defined by a surface of the intermediate plate, and the at least one valve seat being provided with at least one annular blind hole recess having a tapered conical profile that facilitates the molding process.

20. The method according to claim 19, wherein the coil is injection-molded into the another housing part at a time of fabrication of the another housing part in a single production step.

\* \* \* \* \*